(12) United States Patent
Kawada et al.

(10) Patent No.: US 6,603,505 B1
(45) Date of Patent: Aug. 5, 2003

(54) DEVICE FOR OBJECTIVELY EVALUATING THE QUALITY OF A DIGITAL TRANSMITTED PICTURE

(75) Inventors: Ryoichi Kawada, Tokyo (JP); Shuichi Matsumoto, Tokyo (JP)

(73) Assignee: KDD Corporation, Tokyo (JP)

( * ) Notice: Subject to any disclaimer, the term of this patent is extended or adjusted under 35 U.S.C. 154(b) by 394 days.

(21) Appl. No.: 09/653,332

(22) Filed: Aug. 31, 2000

(30) Foreign Application Priority Data

Sep. 10, 1999 (JP) .......................................... 11-257554

(51) Int. Cl.$^7$ ................................................ H04N 17/00

(52) U.S. Cl. ........................................ 348/192; 348/193

(58) Field of Search ................................ 348/192, 193, 348/180; 714/819–821; 382/232, 234, 309

(56) References Cited

U.S. PATENT DOCUMENTS

| | | | |
|---|---|---|---|
| 5,134,633 A | * | 7/1992 | Werner .......................... 325/38 |
| 5,530,483 A | * | 6/1996 | Cooper et al. .............. 348/518 |
| 6,351,281 B1 | * | 2/2002 | Cooper ........................ 348/192 |
| 6,400,400 B1 | * | 6/2002 | Isnardi ......................... 348/180 |

* cited by examiner

*Primary Examiner*—Victor R. Kostak
(74) *Attorney, Agent, or Firm*—Armstrong, Westerman & Hattori, LLP

(57) ABSTRACT

A device for objectively evaluating the quality of a digitally transmitted picture. This device compresses encoded pictures x1 and x2 transmitted on two links that are decoded by a first decoder and a second decoder. A variance value $\sigma^2(x1)$ of the decoded picture decoded by the first decoder is measured by a variance measuring unit. A variance value $\sigma^2(x1-x2)$ of a signal indicative of a difference between the decoded pictures decoded by the first and the second decoders is measured. These two variance values are used to determine image quality.

6 Claims, 4 Drawing Sheets

Fig. 1
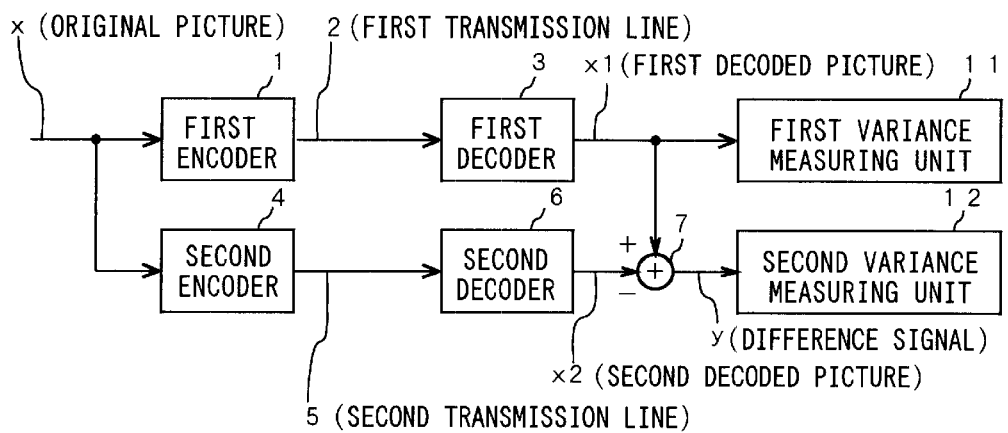
Fig. 2
$$\sigma^2(x_1) = \sigma^2(x+d_1) = s+n+2\sqrt{sn}\rho_{xd1} \quad \cdots\cdots(1)$$
$$\sigma^2(x_1-x_2) = \sigma^2(d_1-d_2) = 2n(1-\rho_{d1d2}) \quad \cdots\cdots(2)$$
$$\frac{\sigma^2(x_1-x_2)}{\sigma^2(x_1)} = \frac{2\{1-\rho_{d1d2}(s/n)\}}{1+s/n+2\sqrt{s/n}\rho_{xd1}(s/n)} \quad \cdots\cdots(3)$$
Fig. 3
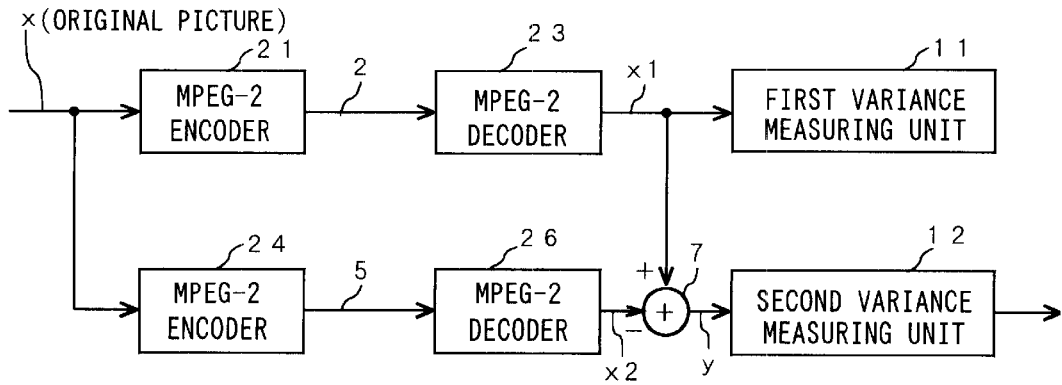

DEVICE FOR OBJECTIVELY EVALUATING THE QUALITY OF A DIGITAL TRANSMITTED PICTURE

BACKGROUND OF THE INVENTION

1. Field of the Invention

The present invention relates to a device for objectively evaluating the quality of a digital transmitted picture and, more particularly, to a device for objectively evaluating the quality of a digital transmitted picture, suitable for use in a system in which a video picture is compressed, encoded and transmitted on a plurality of links, so as to improve the reliability of transmission.

2. Description of the Related Art

There have been conventionally studied and developed automatic quality measurements (objective picture quality evaluations) of a digital compressed picture, thus offering various proposals. Such objective picture quality evaluations include a first method for evaluating a picture quality based on the comparison of a received picture with an original picture after the model of human subjective evaluations and a second method for evaluating a picture quality based on only a received picture.

In the first method, that is, the method using an original picture, a picture quality can be evaluated with high accuracy. This method is disclosed in detail in, for example, the following literature: T. Hamada, et al., "Picture Quality Assessment System by Three-layered Bottom-up Noise Weighting Considering Human Visual Perception," SMPTE Journal, Vol. 108, No. 1, pp. 20–26, January, 1999.

If the quality of a received picture is to be evaluated by the second method, namely, the quality of a received picture is to be evaluated during actual transmission of a digital compressed picture, its original picture cannot be used for the evaluation, so that the method disclosed in the aforementioned literature cannot be adopted.

As described above, if the quality of the received picture is to be evaluated during the actual transmission of the picture, the picture quality must be evaluated based on only the received picture since its original picture cannot be used. Nevertheless, there has not been conventionally made any marked proposal for the above-described evaluation.

SUMMARY OF THE INVENTION

An object of the present invention is to provide a device for objectively evaluating the quality of a digital transmitted picture, in which the quality of a received picture can be objectively evaluated with high accuracy by using only the received picture in the compression encoding transmission of a picture on a plurality of links.

In order to achieve the above-described object, the present invention provides a device for objectively evaluating the quality of a digital transmitted picture to be transmitted in a transmission system consisting of a plurality of links, in which the device comprises means for measuring a variance value of a received picture on one of the plurality of links, means for measuring a variance value of a signal indicative of a difference between the received picture on one of the plurality of links and another received picture on the other link, and means for holding therein a corresponding table indicative of relationship between the two variance values and SN ratios of the received pictures to an original picture, the quality of the received picture being evaluated in reference to the corresponding table based on the two variance values.

Furthermore, the present invention provides a device for objectively evaluating the quality of a digital transmitted picture to be transmitted in a transmission system consisting of a plurality of links, therein an original picture and a received picture are subjected to a filtration.

According to the present invention, it is possible to estimate the SN ratio of the received picture to the original picture or the SN ratio weighted with the visual characteristics by using only the received pictures on the two links in the compression encoding transmission of the picture on the plurality of links.

BRIEF DESCRIPTION OF THE DRAWINGS

FIG. 1 is a block diagram illustrating the principle of the present invention;

FIG. 2 illustrates mathematical equations;

FIG. 3 is a block diagram illustrating means for creating a corresponding table for a device for objectively evaluating the quality of a digital transmitted picture in a first preferred embodiment according to the present invention;

DETAILED DESCRIPTION OF THE PREFERRED EMBODIMENTS

Figure 4:
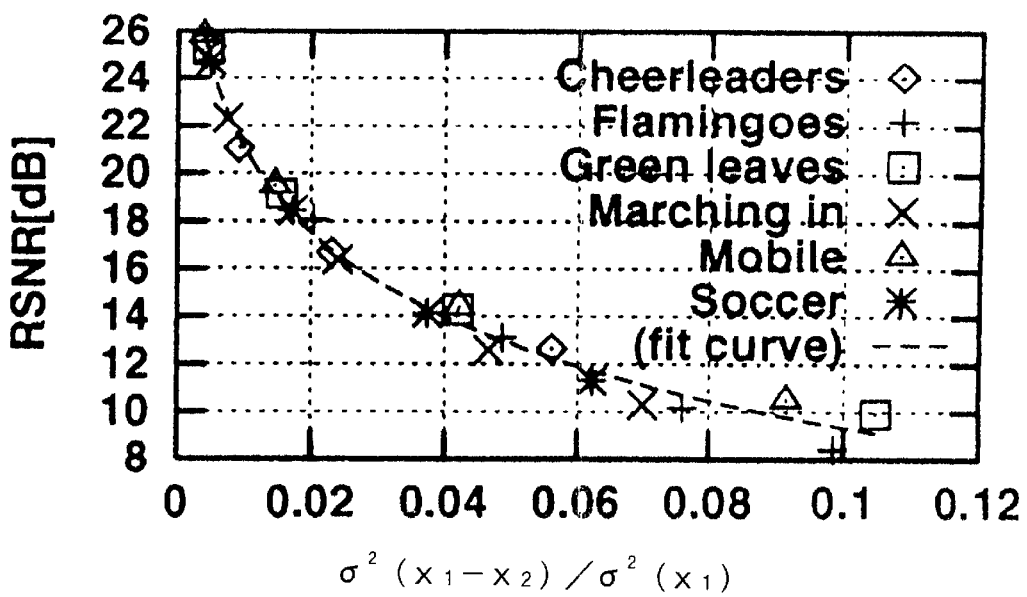
FIG. 4 is a graph illustrating one example of a corresponding table.

Preferred embodiments according to the present invention will be explained in detail below in reference to the drawings. First, referring to FIG. 1, a description will be given of the principle of the present invention. FIG. 1 is a block diagram illustrating the schematic configuration of a system in order to explain the principle, wherein two transmission links are illustrated.

A first transmission link consists of a first encoder 1, a first transmission line 2 and a first decoder 3; in contrast, a second transmission link consists of a second encoder 4, a second transmission line 5 and a second decoder 6. The first encoder 1 and the second encoder 4 encode an original picture x independently of each other. The first decoder 3 and the second decoder 6 decode received signals, thereby outputting a first decoded picture x1 and a second decoded picture x2, respectively. A subtracter 7 subtracts the second decoded picture x2 from the first decoded picture x1, thereby outputting a difference signal y (=x1−x2). Furthermore, a first variance measuring unit 11 measures the variance of the first decoded picture x1; in contrast, a second variance measuring unit 12 measures the variance of the difference signal y.

As described above, x represents a signal indicating the original picture; x1 and x2, signals indicating the decoded pictures via the two links, respectively; and d1 and d2, encoding noises in the first and second encoders 1 and 4, respectively. Furthermore, s denotes the signal variance of the original picture signal x; n, power of each of the encoding noises d1 and d2; $\rho_{xd1}$, the correlation between the original picture signal x and the encoding noise d1; and $\rho_{d1d2}$, the correlation between the encoding noises d1 and d2. Assuming in this way, the variance $\sigma^2(x1)$ of the decoded signal x1 is expressed by Equation (1) of FIG. 2; in contrast, the variance $\sigma^2(x1-x2)$ of the difference signal y (=x1-x2) is expressed by Equation (2) of FIG. 2.

Here, it can be construed that the encoding noises d1 and d2 possess qualitative properties (1) and (2), as described below, irrespective of images of pictures.

(1) If a transmission bit rate becomes very low, that is, a ratio s/n approximates to 1, a quantizing step size becomes very high, so that a level after the quantization becomes 0, i.e., d1 and d2 approximate to −x. Namely, the noises of both the links become substantially equal to each other. Consequently, the correlation $\rho_{xd1}$ between the original picture signal x and the encoding noise d1 approximates to −1; to the contrary, the correlation $\rho_{d1d2}$ between the encoding noises d1 and d2 approximates to 1.

(2) As the transmission bit rate becomes higher, that is, the ratio s/n becomes higher, the encoding noises of both the links become substantially independent of each other. Namely, the correlation $\rho_{d1d2}$ approximates to 0; and further, the correlation $\rho_{xd1}$ also approximates to 0.

Here, when the correlation $\rho_{xd1}$ between the original picture signal x and the encoding noise d1 and the correlation $\rho_{d1d2}$ between the encoding noises d1 and d2 are expressed by functions $\rho_{xd1}(s/n)$ and $\rho_{d1d2}(s/n)$ of s/n, respectively, Relational Equation (3) of FIG. 2, i.e., an equation representing the interrelation among s/n, $\sigma^2(x1)$ and $\sigma^2(x1-x2)$ can be obtained from Equations (1) and (2).

In Equation (3), if the functions $\rho_{xd1}(s/n)$ and $\rho_{d1d2}(s/n)$ are independent of the picture, the ratio s/n of the received picture to the original picture can be estimated from only the decoded pictures on the two links in a manner described below.

(a) A preliminary experiment is carried out by using the system for experiments illustrated in FIG. 1 or a system which is actually used. Specifically, various test pictures of, for example, "a cheerleader," "a flamingo," "green leaves" and the like are encoded in various bit rates, and then, $\sigma^2(x1)$ and $\sigma^2(x1-x2)$ are obtained by the first variance measuring unit 11 and the second variance measuring unit 12, respectively.

(b) Next, the ratio s/n is obtained from the original picture x and the decoded pictures x1 and x2 respectively decoded by the first and second decoders 3 and 6 with respect to each of the test pictures used in the above-described step (a).

(c) Subsequently, the relationship between $\sigma^2(x1-x2)/\sigma^2(x1)$ and s/n is tabulated based on the values obtained in the above-described steps (a) and (b).

(d) Thereafter, during actual transmission of a digital transmitted picture, $\rho 2(x131\ x2)/\sigma^2(x1)$ is measured based on the decoded pictures on the two links, and finally, the ratio s/n of the received picture is estimated in reference to the table created in the step (c).

As described above, the variance value of the difference signal and the variance value of either one of the signals are measured by using only the received pictures on the plurality of links, and then, the S/N ratio of the received picture to the original picture is estimated in reference to the corresponding table in which the variance values correspond to the S/N ratios. This is the principle of the present invention.

Subsequently, a preferred embodiment according to the present invention will be described below in reference to FIG. 3. In this embodiment, there are used MPEG-2 encoders 21 and 24 and MPEG-2 decoders 23 and 26. Other reference numerals designate the same as or equivalent to those illustrated in FIG. 1.

First of all, a description will be given of a method for creating a corresponding table representing the relationship between $\sigma^2(x1)/\sigma^2(x1-x2)$ and s/n based on the preliminary experiment. There are prepared various test pictures of, for example, "a cheerleader," "a flamingo," "green leaves" and the like. Thereafter, each of the test pictures is transmitted over transmission lines of first and second links. With respect to the transmission over the transmission line of the first link, each of the test pictures is encoded at various bit rates by the MPEG-2 encoder 21, and then, is transmitted. Subsequently, the encoded picture is decoded by the MPEG-2 decoder 23, so that an SN ratio (RSNR) of a decoded picture x1 to an original picture x is measured. At this time, a signal variance after separation of an average value per block of 16×16 is used as the signal variance s of an original picture signal x.

In the meanwhile, with respect to the transmission over the transmission line of the second link, an encoding timing of an I (intra) picture is shifted from that on the first link, to be encoded by the MPEG-2 encoder 24, and then, is transmitted over a transmission line 5. Subsequently, a value $\sigma^2(x1-x2)/\sigma^2(x1)$ is measured based on a decoded picture x2 decoded by the MPEG-2 decoder 26 and the decoded picture x1 via the first link. Thereafter, the measurement results are plotted in coordinates, in which the abscissa represents the value $\sigma^2(x1-x2)/\sigma^2(x1)$ and the ordinate represents the SN ratio (RSNR).

FIG. 4 is a graph illustrating one example of a table created as described above, in which the abscissa represents the value $\sigma^2(x1-x2)/\sigma^2(x1)$ and the ordinate represents the RSNR. In the example illustrated in FIG. 4, the preliminary experiment is carried out by using six test pictures of "a cheerleader," "a flamingo," "green leaves" and the like, and then, the RSNRs with respect to the values $\sigma^2(x1-x2)/\sigma^2(x1)$ are plotted on the graph. As is clear from the graph, it is found that points in the graph, that is, values measured by encoding the six test pictures at various bit rates can be plotted on a regression curve or an approximate curve indicated by a broken line (a) within an error of (1 dB. This regression curve corresponds to the corresponding table of the SN ratios.

Figure 5:
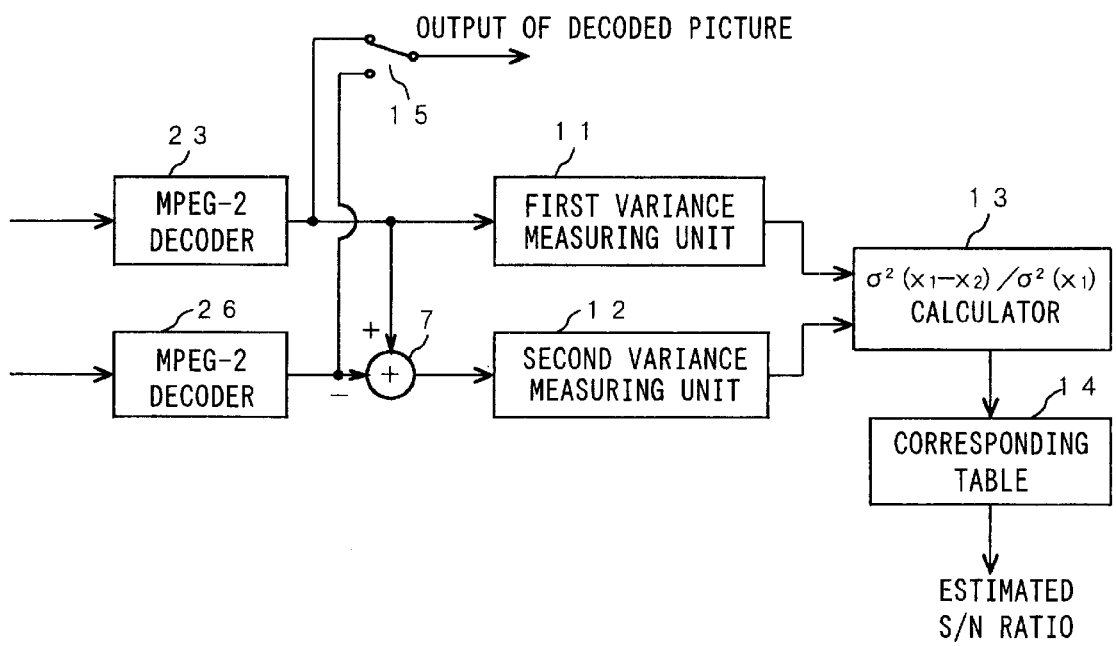
FIG. 5 is a block diagram illustrating the configuration of a device for objectively evaluating the quality of a digital transmitted picture in the first preferred embodiment according to the present invention.

Subsequently, explanation will be made on the configuration and operation of a device for objectively evaluating the quality of a digital transmitted picture in actual use in reference to FIG. 5. FIG. 5 is a block diagram illustrating the configuration of essential parts on a receiving side, in which reference numeral 13 designates a $\sigma^2(x1-x2)/\sigma^2(x1)$ calculator; 14, a corresponding table; 15, a switch; and other reference numerals designate the same as or equivalent to those illustrated in FIG. 3.

The corresponding table 14 stores therein the table which is indicated by the broken line (a) illustrated in FIG. 4 and is obtained as described above. Digital pictures are transmitted via a plurality of, for example, two links. The digital pictures encoded independently of each other are received and decoded by first and second MPEG-2 decoders 23 and 26, respectively. A variance value $\sigma^2(x1)$ of a decoded picture decoded by the first MPEG-2 decoder 23 is measured by a variance measuring unit 11. A variance value $\sigma^2(x1-x2)$ of a signal indicative of a difference between the decoded pictures decoded by the first and second MPEG-2 decoders 23 and 26 is measured by another variance measuring unit 12. The variance values $\sigma^2(x1)$ and $\sigma^2(x1-x2)$ are input into the $\sigma^2(x1-x2)/\sigma^2(x1)$ calculator 13, which then calculates a value $\sigma^2(x1-x2)/\sigma^2(x1)$. The value $\sigma^2(x1-x2)/\sigma^2(x1)$ is sent to the corresponding table 14, from which an RSNR, i.e., an SN ratio corresponding to the value $\sigma^2(x1-x2)/\sigma^2(x1)$ is determined. In the meanwhile, the decoded picture via the link selected by the switch 15 is output from the switch 15.

As described above, in the present embodiment, it is possible to evaluate the quality of the received picture during the actual transmission of the picture without using any original picture.

Figure 6:
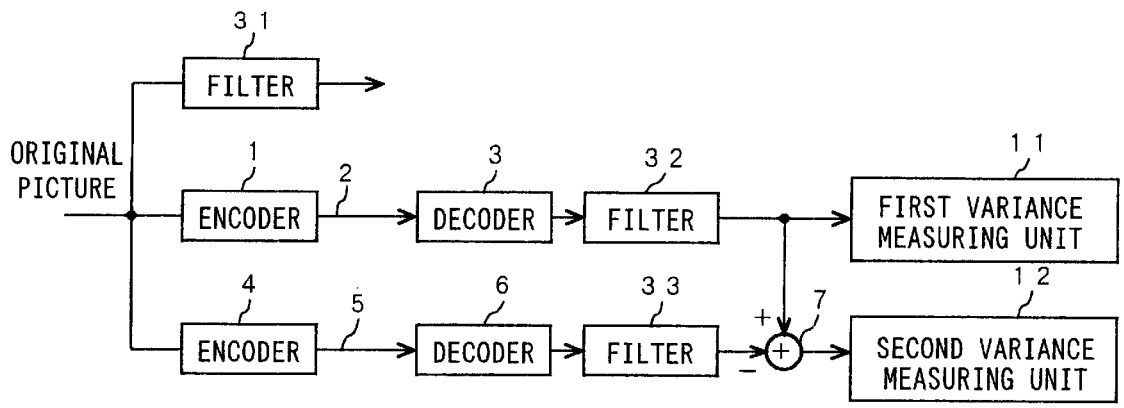
FIG. 6 is a block diagram illustrating means for creating a corresponding table for a device for objectively evaluating the quality of a digital transmitted picture in a second preferred embodiment according to the present invention.
Figure 7:
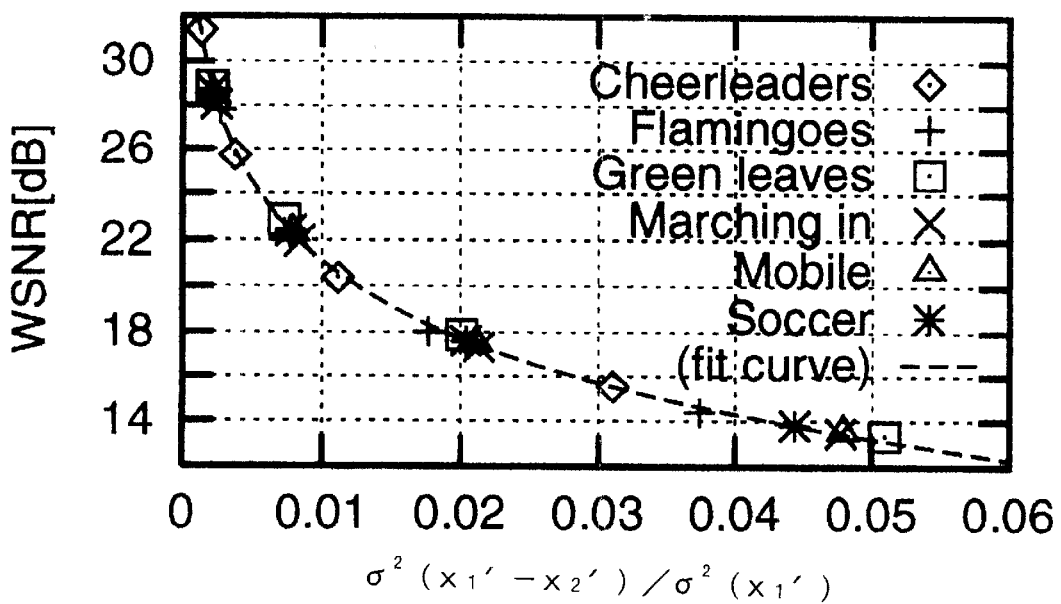
FIG. 7 illustrates another example of a corresponding table.

Next, a description will be given of a second preferred embodiment according to the present invention in reference to FIGS. 6 to 8. FIG. 6 is a block diagram illustrating the configuration for creating a corresponding table. In the present embodiment, after each of received pictures is subjected to filtration representing visual characteristics, a value $\sigma^2(x1-x2)/\sigma^2(x1)$ is obtained. An SN ratio weighted with the visual characteristics is estimated in reference to the corresponding table obtained by the filtration representing the visual characteristics. In FIG. 6, reference numerals 31, 32 and 33 designate filters representing the visual characteristics, and other reference numerals designate the same as or equivalent to those illustrated in FIG. 1. A two-dimensional band-pass filter consisting of constituent elements 1 to 5 illustrated in FIG. 1 disclosed in Japanese Patent Application Laid-open No. 307925/1995 filed by the inventors of the present application may be used as each of the filters 31 to 33 representing the visual characteristics.

The corresponding table is obtained by the same method as that in the first embodiment, i.e., by subjecting an original picture to the filter 31 and subjecting decoded pictures on two links to the filters 32 and 33, respectively, as illustrated in FIG. 6. FIG. 7 is a graph illustrating one example of the corresponding table obtained as described above, in which the abscissa represents $\sigma^2(x1'-x2')/\sigma^2(x1')$ and the ordinate represents a WSNR (a weighted SN ratio). A regression curve (b) corresponds to the corresponding table of the SN ratio. Here, an apostrophe (') signifies the subjection to the filtration.

Figure 8:
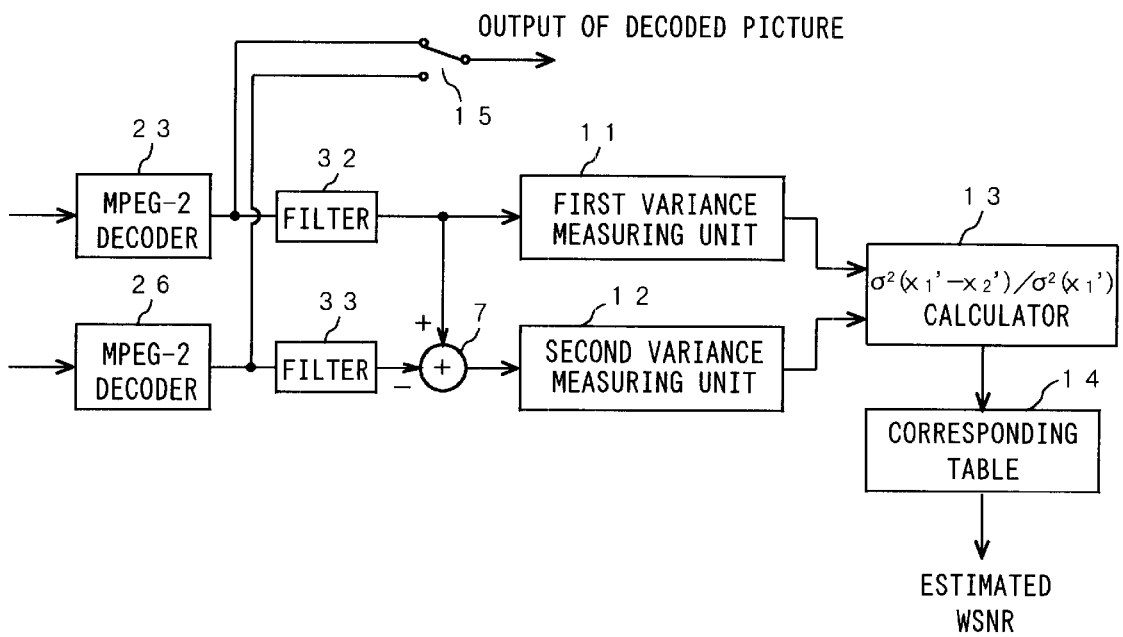
FIG. 8 is a block diagram illustrating the configuration of a device for objectively evaluating the quality of a digital transmitted picture in the second preferred embodiment according to the present invention.

FIG. 8 is a block diagram illustrating the configuration of a device for objectively evaluating the quality of a digital transmitted picture in actual use in the second preferred embodiment. The same reference numerals in FIG. 8 as those in FIG. 5 designate the same as or equivalent to those illustrated in FIG. 5.

A variance measuring unit 11 measures a variance value $\sigma^2(x1')$ of a picture obtained by subjecting a decoded picture decoded by a first MPEG-2 decoder 23 to the filter 32. In contrast, another variance measuring unit 12 measures a variance value $\sigma^2(x1'-x2')$ of a difference between pictures obtained by subjecting decoded pictures decoded by the first MPEG-2 decoder 23 and a second MPEG-2 decoder 26 to the first filter 32 and a second filter 33, respectively. The variance values $\sigma^2(x1')$ and $\sigma^2(x1'-x2')$ measured by the variance measuring units 11 and 12, respectively, are input into a $\sigma^2(x1'-x2')/\sigma^2(x1')$ calculator 13, which then calculates a value $\sigma^2(x1'-x2')/\sigma^2(x1')$. Subsequently, the corresponding table is accessed based on the calculated value, and then, a WSNR corresponding to the calculated value is obtained. This WSNR is an SN ratio weighted with estimated visual characteristics of the picture during the actual transmission.

In the present embodiment, it is possible to evaluate the quality of the received picture during the actual transmission without using any original picture, like in the first embodiment.

As is clear from the above description, according to the present invention, it is possible to estimate the SN ratio of the received picture to the original picture or the SN ratio weighted with the visual characteristics by using only the received pictures on the two links in the compression encoding transmission of the picture on the plurality of links. Furthermore, it is possible to objectively evaluate the quality of the received picture with high accuracy by using only the received pictures on the two links.

What is claimed is:

1. A device for objectively evaluating the quality of a digital transmitted picture to be transmitted in a redundant parallel transmission system consisting of a first link (x1) and a second link (x2), the device comprising:

means for measuring a variance value $\sigma^2(x1)$ of a received picture on the first link;

means for measuring a variance value of a signal indicative of a difference $\sigma^2(x1-x2)$ between the received picture on the first link and another received picture on the second link; and means for holding therein a corresponding table indicative of relationship between the two variance values and SN ratios of the received pictures to an original picture; the quality of the received picture being evaluated in reference to the corresponding table based on the two variance values.

2. A device for objectively evaluating the quality of a digital transmitted picture as claimed in claim 1, wherein assuming that $\sigma^2(x1)$ represents the variance value of the received picture on the first link and $\sigma^2(x1-x2)$ represents the variance value of the signal indicative of the difference between the received picture on the first link and the received picture on the second link, the corresponding table represents the relationship between the SN ratio of the received picture to the original picture and a value $\sigma^2(x1-x2)/\sigma^2(x1)$.

3. A device for objectively evaluating the quality of a digital transmitted picture as claimed in claim 1, wherein the first link in the transmission system includes a first encoder for encoding the original picture, a first transmission line for transmitting an encoded signal thereon and a first decoder for decoding a received encoded signal, and further, the second link includes a second encoder for encoding the original picture independently of the first encoder, a second transmission line for transmitting an encoded signal thereon and a second decoder for decoding a received encoded signal.

4. A device for objectively evaluating the quality of a digital transmitted picture to be transmitted in a transmission system consisting of a first link (x1) and a second link (x2), the device comprising:

means for measuring a variance value $\sigma^2(x1)$ of a received picture on the first link, the received picture being subjected to filtration representing visual characteristics;

means for measuring a variance value of a signal indicative of a difference $\sigma^2(x1-x2)$ between the received picture on the first link and another received picture on the second link, each of the received pictures being subjected to the filtration; and means for holding therein a corresponding table indicative of relationship between the two variance values and SN ratios of the received pictures to an original picture, the original picture being subjected to filtration representing visual characteristics and the received picture having been subjected to the filtration;

the quality of the received picture being evaluated in reference to the corresponding table based on the two variance values.

5. A device for objectively evaluating the quality of a digital transmitted picture as claimed in claim 1, wherein assuming that $\sigma^2(x1')$ represents the variance value of the received picture, which is subjected to the filtration representing the visual characteristics, on one of the links and $\sigma^2(x1'-x2')$ represents the variance value of the signal indicative of the difference between the received pictures, which are subjected to the filtration, on the first link and the second link, the corresponding table represents the relationship between the SN ratio of the received picture to the original picture and a value $\sigma^2(x1'-x2')/\sigma^2/x1')$.

6. A device for objectively evaluating the quality of a digital transmitted picture as claimed in claim 4, wherein the first link in the transmission system includes a first encoder for encoding the original picture, a first transmission line for transmitting an encoded signal thereon and a first decoder for decoding a received encoded signal and a first filter representing visual characteristics, and further, the second link includes a second encoder for encoding the original picture independently of the first encoder, a second transmission line for transmitting an encoded signal thereon and a second decoder for decoding a received encoded signal and a second filter representing visual characteristics.

* * * * *